April 6, 1926.  
F. D. SMITH  
1,579,407  
FEEDING DEVICE FOR CHOCOLATE MOLDING MACHINES  
Filed Oct. 28, 1922  4 Sheets-Sheet 1

Witnesses:  
Inventor  
Frederick D. Smith  
By Joshua R. H. Potts,  
His Attorney April 6, 1926. 1,579,407
F. D. SMITH
FEEDING DEVICE FOR CHOCOLATE MOLDING MACHINES
Filed Oct. 28, 1922  4 Sheets-Sheet 2

Inventor
Frederick D. Smith
By Joshua R. H. Potts,
His Attorney

Witnesses:

April 6, 1926. 1,579,407
F. D. SMITH
FEEDING DEVICE FOR CHOCOLATE MOLDING MACHINES
Filed Oct. 28, 1922  4 Sheets-Sheet 3

Witnesses:

Inventor
Frederick D. Smith
By Joshua R. H. Hobbs,
His Attorney

April 6, 1926.  1,579,407
F. D. SMITH
FEEDING DEVICE FOR CHOCOLATE MOLDING MACHINES
Filed Oct. 28, 1922    4 Sheets-Sheet 4

Inventor
Frederick D. Smith
Witnesses:
By Joshua R. H. Potts,
His Attorney

Patented Apr. 6, 1926.  1,579,407

UNITED STATES PATENT OFFICE.

FREDERICK D. SMITH, OF PHILADELPHIA, PENNSYLVANIA.

FEEDING DEVICE FOR CHOCOLATE-MOLDING MACHINES.

Application filed October 28, 1922. Serial No. 597,498.

*To all whom it may concern:*

Be it known that I, FREDERICK D. SMITH, a citizen of the United States, residing at Philadelphia, in the county of Philadelphia and State of Pennsylvania, have invented certain new and useful Improvements in Feeding Devices for Chocolate-Molding Machines, of which the following is a specification.

My invention relates to candy making apparatus, and more particularly to devices for dropping or feeding almonds or other nuts, raisins or the like to mold compartments.

The object of the invention is to provide a novel device of the above character by which the feeding may be positively controlled so that the same number of almonds or other solids will be dropped into each compartment, and freed from any shells, or other foreign matter, thereby insuring a clean and desirable product.

This object, and other advantageous ends which will be described hereinafter, I attain in the following manner, reference being had to the accompanying drawings in which—

Figure 1:
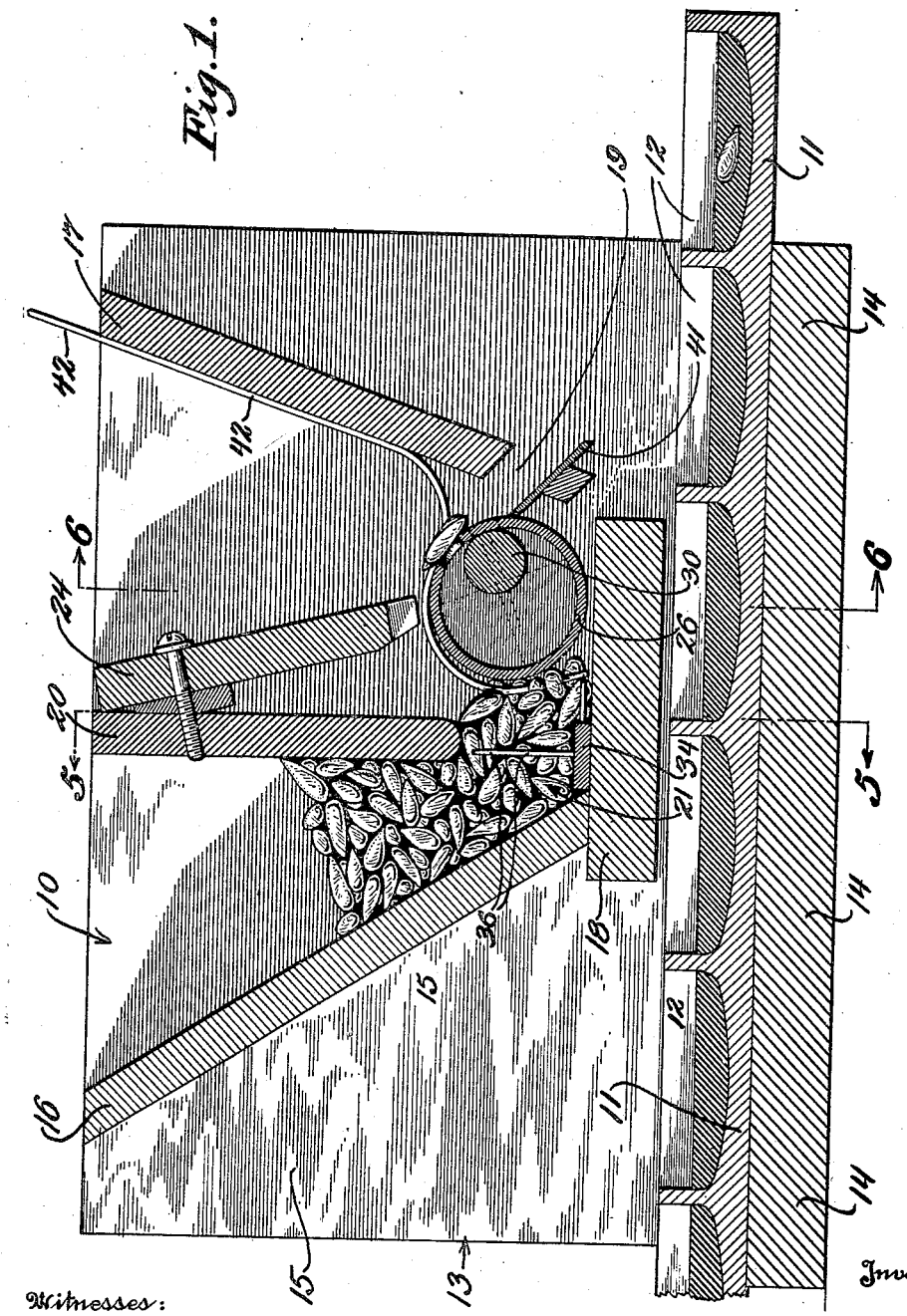
Figure 1 is an enlarged vertical longitudinal sectional view of the device.
Figure 2:
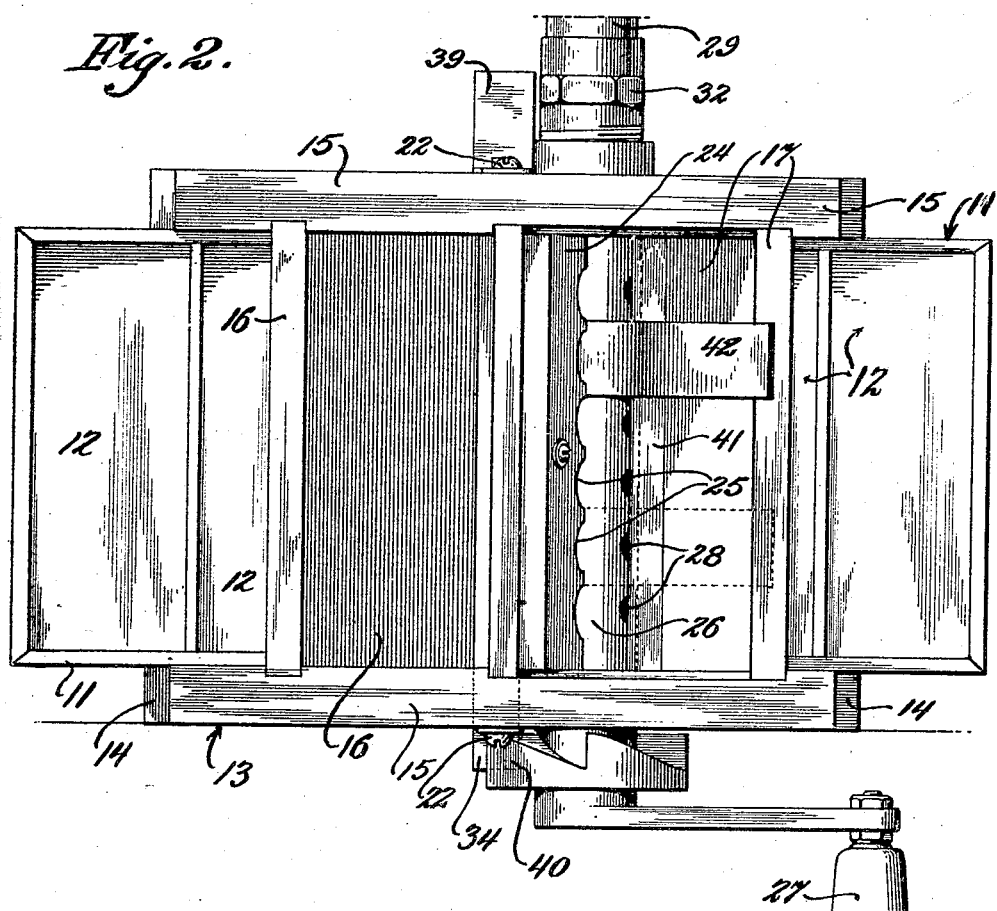
Figure 2 is a top plan view.
Figure 8:
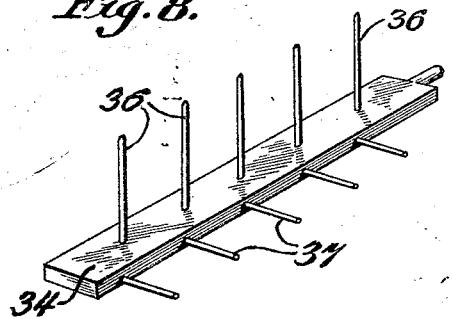
Figure 7:
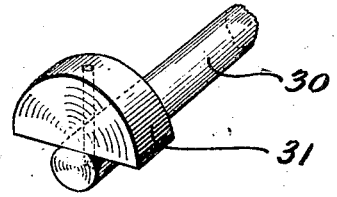
Figure 3:
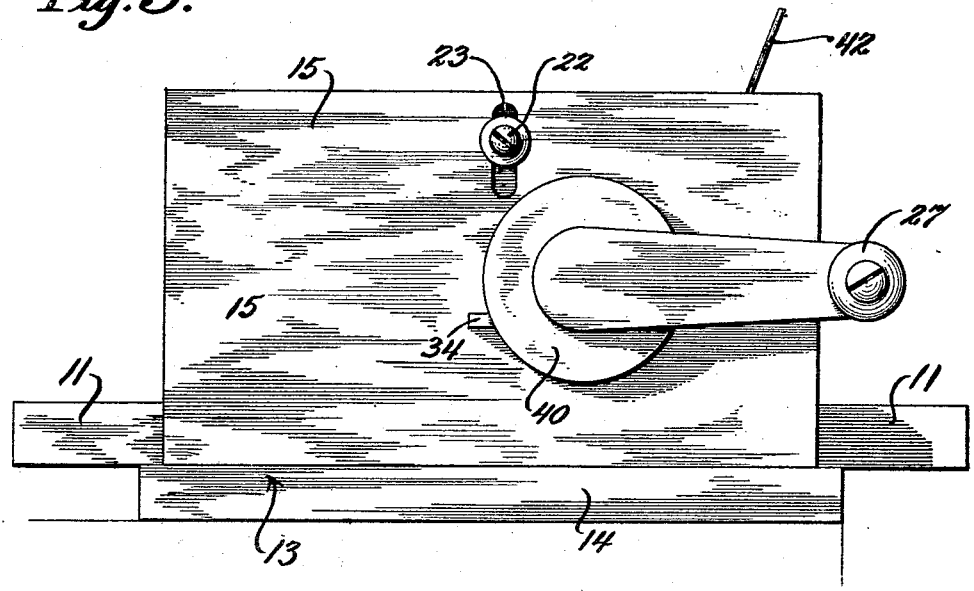
Figure 3 is a side elevation.
Figure 4:
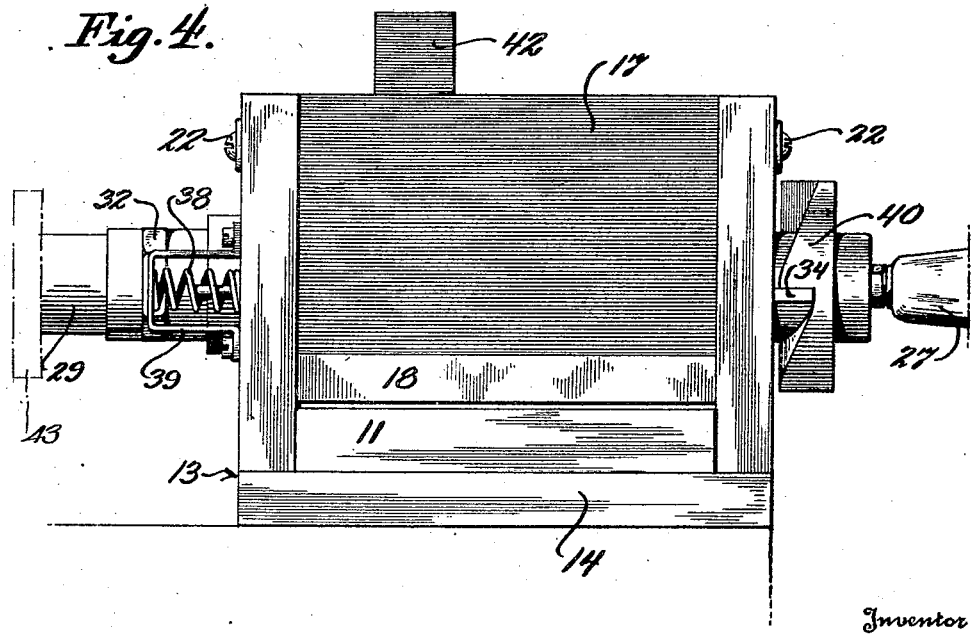
Figure 4 is an end view looking toward the left end of Figure 2.
Figure 5:
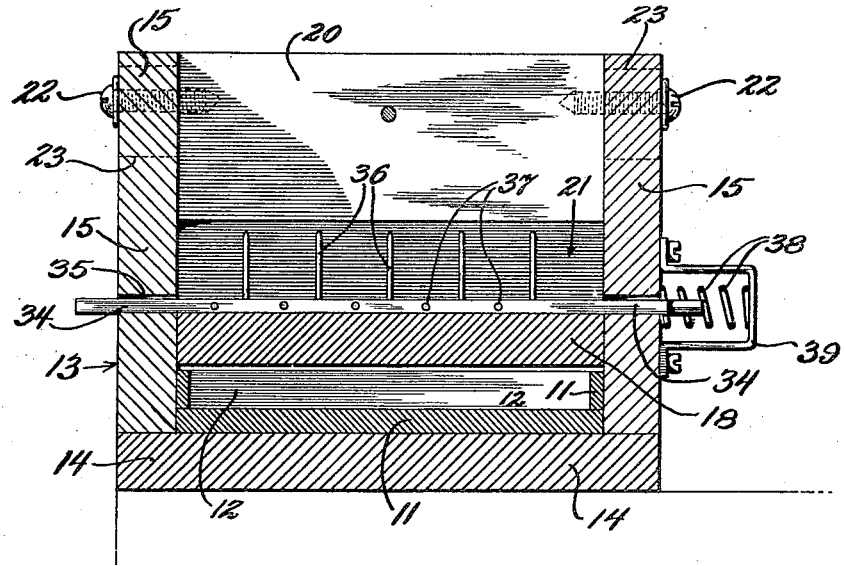
Figure 6:
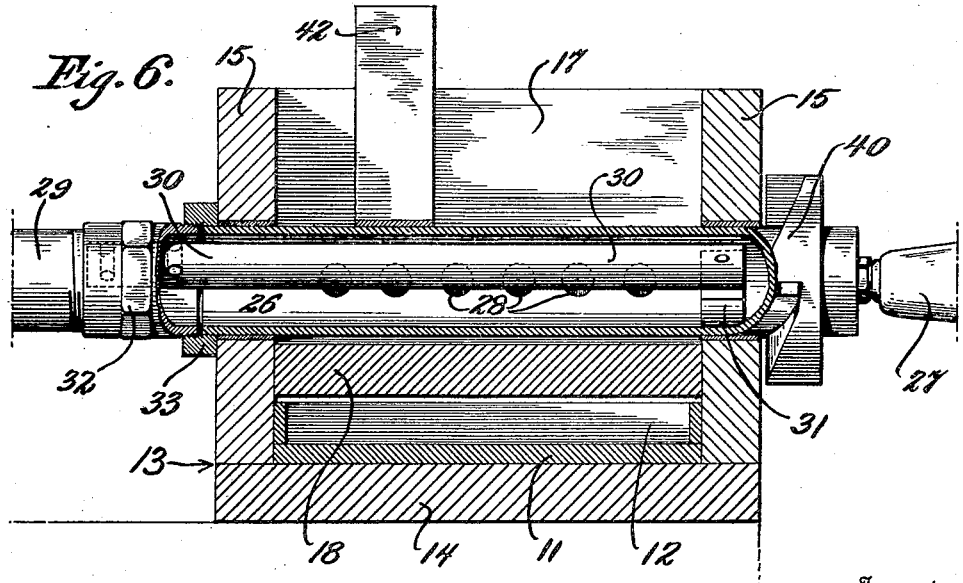

Figure 5 is a transverse vertical sectional elevation taken on the line 5—5 of Figure 1, with certain parts omitted, Figure 6 is a transverse vertical sectional elevation, taken on the line 6—6 of Figure 1, with part of the suction cylinder broken away and in section, Figure 7 is a fragmentary perspective view of suction cut-off means, and Figure 8 is a perspective view of an agitator forming a part of the device.

Heretofore in this class of machines, much difficulty has been experienced in controlling the feeding action so that the same number of nuts or other edible solids would be dropped into each mold compartment and the bars produced have lacked uniformity, some containing excess numbers, and others insufficient numbers. The bars are also liable to contain fragments of shells or other objectionable foreign matter.

The present device is designed to overcome these objections and embodies a hopper beneath which a pan or mold is moved before or after the chocolate or other fluid confection is deposited therein, means for agitating the solids and suction operated means for feeding a predetermined number of solids into the mold compartments in regular order and free of shells or other foreign matter, thus insuring a uniform and salable product.

In the drawings, 10 is a hopper beneath which a mold 11 is adapted to move, the mold having a series of compartments 12 in which the chocolate or other confection bars are to be molded. As shown, the device includes a channel-shaped frame 13 having a base 14, and parallel sides 15. Downwardly diverging inclined walls 16 and 17 connect the sides to form hopper 10 in which the almonds or other solids are placed. A horizontal shelf 18 is provided at the bottom of the hopper above compartments 12 so that fragments of shells or other foreign matter will not drop into the molds. The lower end of wall 16 contacts with shelf 18 and the lower end of wall 17 terminates a short distance above the shelf to provide an outlet 19. A vertical partition 20 terminates above shelf 18 to provide a discharge opening 21. Partition 20 extends between sides 15, is slidable in guideways on the inner faces thereof and has clamping means 22 at each end, passing through slots 23, adapted to hold the partition in vertically adjusted positions to vary the size of discharge opening 21. An adjusting plate 24 is secured to partition 20 and inclines forwardly over shelf 18. The lower edge of plate 24 is located above the lower edge of partition 20 and is provided with a series of equidistant concave recesses 25 adapted to permit the passage of a nut. A cylinder 26 is journaled in sides 15 between shelf 18 and the lower edge of plate 24 and provided with means, such as a crank handle 27, whereby it may be rotated. The cylinder has a row of holes 28 in its wall in alignment with recesses 25 and has swiveled or other connection to an air suction pipe 29 at one end, to create suction in the cylinder. The holes 28 should be of less area than the nuts to be fed so that nuts will not pass through. A cut-off is provided which preferably consists of a circular rod 30, disposed against the inner surface of the cylinder wall, having a bearing 31 at one end around which the cylinder rotates and a wrench head 32 at the other end, threaded in a collar 33 carried by the adjacent side wall, by which the rod is held in position and adapted to be adjusted circumferentially within the cylinder. The rod 30 is of smaller diameter than the cylinder and its periphery being tangential to the inner surface of the cylinder, rotation of the latter effects a gradual opening and closing of holes 28 as they pass the rod.

Agitating means is provided within the hopper and preferably includes a bar 34 slidably mounted on shelf 18 adjacent wall 16 and guided in slots 35 in sides 15. Bar 34 has staggered vertical and horizontal pins 36 and 37. The vertical pins extend upwardly beneath partition 20 and the horizontal pins extend forwardly slightly beneath cylinder 26. The ends of the bar project from sides 15 and a spring 38 is disposed between one end of the strip and a bracket 39, carried by the side, to normally hold the strip in the opposite direction. A cam disk 40 is mounted on cylinder 26 and alternately presses and releases the agitator bar as the cylinder is rotated thereby causing it to reciprocate. A scraper 41 is mounted in outlet 19 and extends downwardly from cylinder 26. A damper 42, preferably in the form of a strip, is slidably mounted on cylinder 26 around which it partly extends and projects along and above wall 17, so that it may be moved over any one of holes 28.

In operation of the device, partition 20 and plate 24 are adjusted with reference to the nature and size of the substances to be fed. The nuts are placed in hopper 10 and a fan 43, shown diagrammatically, is started to create suction in cylinder 26 through pipe 29. Mold 11 is placed in position to be fed beneath outlet 19. The cylinder is then rotated and the nuts in the hopper are agitated. As the cylinder rotates, in contact with the nuts, nuts will be drawn over the holes by suction, will adhere to the cylinder and pass through recesses 25. As holes 28 approach the cut-off rod, the holes will be gradually closed and suction cut off, thereby releasing the nuts and permitting them to drop over scraper 41 into the mold compartments. By employing a round rod for closing the holes 28, scraping of the almonds or other bodies is prevented and the suction gradually cut off and in. By uniformly rotating the cylinder, the same number of nuts or other objects will be dropped into each compartment of the mold. The suction will collect and remove any fragments of shells, thereby insuring a clean and desirable product.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In a candy molding machine, a hopper adapted to contain nuts; mold compartments movably mounted under the hopper; a cylinder rotatably mounted adjacent the hopper discharge and having a row of holes disposed lengthwise thereof; means for causing suction in the cylinder whereby the nuts may be sucked from the hopper to the holes; means for preventing more than a single nut from being carried over the cylinder by a suction hole, and means within the cylinder for shutting off the suction through the hole and discharging the nuts into the mold compartments.

2. In a candy molding machine, a hopper adapted to contain nuts; mold compartments movably mounted under the hopper; a cylinder rotatably mounted adjacent the hopper discharge and having a series of holes disposed lengthwise thereof; means for causing suction in the cylinder whereby the nuts may be sucked from the hopper to the holes; a plate having a recessed edge adjustably mounted above the cylinder to prevent more than a single nut from being carried over by a suction hole, and means for shutting off the suction through the holes and discharging the nuts into the mold compartments.

3. In a candy molding machine, a hopper adapted to contain nuts; mold compartments movably mounted under the hopper; a cylinder having a series of holes rotatably mounted adjacent the hopper discharge; means for causing suction in the cylinder whereby the nuts may be sucked from the hopper to the holes; means within the cylinder for shutting off the suction through the holes and discharging the nuts into the mold compartments; an agitator mounted between the hopper and cylinder, and means operatively connecting the agitator with the cylinder.

4. In a candy molding machine, a hopper adapted to contain nuts; mold compartments movably mounted under the hopper; a cylinder having a series of holes rotatably mounted adjacent the hopper discharge; a bar slidably mounted between the hopper and the cylinder; pins projecting from the bar; means operatively connecting the bar with the cylinder; means for causing suction in the cylinder whereby the nuts will be sucked from the hopper to the holes, and means for shutting off the suction through the holes and discharging the nuts into the mold compartments.

5. In a candy molding machine, a hopper adapted to contain nuts; mold compartments movably mounted under the hopper; a cylinder rotatably mounted adjacent the hopper discharge and having a row of holes disposed lengthwise thereof; means for causing suction in the cylinder whereby the nuts may be sucked from the hopper to the holes; means for preventing more than a single nut from being carried over the cylinder by a suction hole; means within the cylinder for shutting off the suction through the holes, and means without the cylinder for closing one or more holes against suction.

In testimony whereof I have signed my name to this specification.

FREDERICK D. SMITH.